US012438266B2

(12) United States Patent
Tang et al.

(10) Patent No.: US 12,438,266 B2
(45) **Date of Patent: *Oct. 7, 2025**

(54) ELECTRONIC PACKAGE AND MANUFACTURING METHOD THEREOF, AND ANTENNA MODULE AND MANUFACTURING METHOD THEREOF

(71) Applicant: SILICONWARE PRECISION INDUSTRIES CO., LTD., Taichung (TW)

(72) Inventors: Shao-Tzu Tang, Taichung (TW); Chih-Hsien Chiu, Taichung (TW); Wen-Jung Tsai, Taichung (TW); Ko-Wei Chang, Taichung (TW); Chia-Chu Lai, Taichung (TW)

(73) Assignee: SILICONWARE PRECISION INDUSTRIES CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/769,067

(22) Filed: Jul. 10, 2024

(65) Prior Publication Data

US 2024/0364001 A1 Oct. 31, 2024

Related U.S. Application Data

(63) Continuation of application No. 17/748,957, filed on May 19, 2022, now Pat. No. 12,068,535.

(30) Foreign Application Priority Data

Mar. 7, 2022 (TW) .................................. 111108211

(51) Int. Cl.

| | |
|---|---|
| ***H01Q 1/48*** | (2006.01) |
| ***H01Q 1/38*** | (2006.01) |
| ***H01Q 1/50*** | (2006.01) |

(52) U.S. Cl.

CPC ................. *H01Q 1/48* (2013.01); *H01Q 1/38* (2013.01); *H01Q 1/50* (2013.01)

(58) Field of Classification Search

CPC .. H01Q 1/48; H01Q 1/38; H01Q 1/50; H01Q 1/241; H01Q 21/0025; H01Q 1/2283; H01Q 1/523; H01Q 21/065; H01Q 21/061; H01Q 1/002; H01Q 1/521; H01Q 1/526; H01Q 21/0093; H01L 23/66

See application file for complete search history.

(56) References Cited

U.S. PATENT DOCUMENTS

| | | | | |
|---|---|---|---|---|
| 11,901,634 | B2 | 2/2024 | Lee et al. | |
| 12,068,535 | B2 * | 8/2024 | Tang | H01Q 1/48 |
| 2019/0191597 | A1 | 6/2019 | Han et al. | |
| 2019/0372198 | A1 | 12/2019 | Dalmia et al. | |
| 2021/0136963 | A1 | 5/2021 | Behl et al. | |

* cited by examiner

*Primary Examiner* — Seung H Lee

(74) *Attorney, Agent, or Firm* — Studebaker Brackett PLLC

(57) ABSTRACT

An antenna module is provided with a plurality of antenna structures and a shielding structure arranged on a plate body, and the shielding structure is located between two adjacent antenna structures, where the shielding structure includes a concave portion formed on the plate body and a dielectric material formed between the concave portion and the antenna structure to generate different impedance characteristics, thereby improving the antenna isolation.

39 Claims, 10 Drawing Sheets

ELECTRONIC PACKAGE AND MANUFACTURING METHOD THEREOF, AND ANTENNA MODULE AND MANUFACTURING METHOD THEREOF

RELATED APPLICATIONS

This is a continuation of U.S. patent application Ser. No. 17/748,957, filed on May 19, 2022, which claims foreign priority under 35 U.S.C. § 119 (a) to Taiwan Application No. 111108211, filed on Mar. 7, 2022, the entire contents of all of which are incorporated herein by reference for all purposes.

BACKGROUND

1. Technical Field

The present disclosure relates to a semiconductor packaging process, and more particularly, to an electronic package with an antenna structure and a manufacturing method thereof.

2. Description of Related Art

With the evolution of semiconductor technology, different packaging product types have been developed for semiconductor products.

At present, with the rapid development of wireless communication and the ever-increasing flow of network resources, the required wireless transmission bandwidth is also increasing. Therefore, the commercial use of the fourth generation mobile communication technology (4G) has just begun, and the research and development of the fifth generation mobile communication technology (5G) has arrived, wherein, in order to improve the electrical quality, various semiconductor products (such as radio frequency modules) have the function of shielding to prevent Electromagnetic Interference (EMI).

However, the demand for 5G antenna elements to be applied to mobile devices causes the size to be reduced due to the miniaturization, resulting in a reduction in the distance between antennas, resulting in poor antenna gain.

Therefore, how to overcome the above-mentioned drawbacks of the prior art has become an urgent issue to be solved at present.

SUMMARY

In view of the various deficiencies of the prior art, the present disclosure provides an antenna module, comprising: a plate body; a plurality of antenna structures arrayed on the plate body; and at least one shielding structure disposed on the plate body and located between the two adjacent antenna structures, wherein the plate body, the plurality of antenna structures and the at least one shielding structure form a substrate, wherein the at least one shielding structure includes a concave portion disposed on the plate body and a dielectric material located between the concave portion and the plurality of antenna structures.

The present disclosure also provides a manufacturing method of an antenna module, comprising: arranging a plurality of antenna structures arrayed on a plate body; and cutting out a concave portion on the plate body, wherein the concave portion is located between the two adjacent antenna structures, and a dielectric material is provided between the concave portion and the plurality of antenna structures, such that the concave portion and the dielectric material serve as a shielding structure, and the plate body, the plurality of antenna structures and the shielding structure form a substrate.

In the aforementioned antenna module and the manufacturing method thereof, the concave portion has a depth equal to a height of each of the plurality of antenna structures.

In the aforementioned antenna module and the manufacturing method thereof, the concave portion has a depth less than a height of each of the plurality of antenna structures. For example, the depth of the concave portion is greater than ⅓ of the height of each of the plurality of antenna structures.

In the aforementioned antenna module and the manufacturing method thereof, the plate body has a plurality of the shielding structures, and a plurality of concave portions of the plurality of shielding structures are spaced apart from each other and not connected, and the plurality of shielding structures and the plurality of antenna structures are staggered. Alternatively, the plate body has a plurality of the shielding structures, and the concave portions of the plurality of shielding structures are connected to form a manifold-shaped groove, such that the groove defines a plurality of antenna accommodating areas, and at least one of the antenna structures is arranged in the single antenna accommodating area. Further, the concave portions are communicated to side surfaces of the plate body.

In the aforementioned electronic package and the manufacturing method thereof, the concave portion has a width designed to be wide outside and narrow inside.

In the aforementioned antenna module and the manufacturing method thereof, the plate body has a ground trace exposed from sidewalls of the concave portion. The present disclosure further comprises forming a metal layer on the sidewalls of the concave portion, wherein the metal layer is electrically connect to the ground trace.

In the aforementioned antenna module and the manufacturing method thereof, the present disclosure further comprises, before forming the concave portion, forming a panel package material on the plate body to cover the plurality of antenna structures, and forming a through hole on the panel package material to form a resonance structure. Alternatively, the aforementioned antenna module and the manufacturing method thereof further comprise providing a resonance structure with a through hole, and the through hole penetrating through the resonance structure, and then pressing the resonance structure onto the plate body to correspondingly cover the plurality of antenna structures, wherein the through hole corresponds to the concave portion, and the through hole communicates with the concave portion.

In the aforementioned antenna module and the manufacturing method thereof, an opening projected contour of the through hole and an opening projected contour of the concave portion are substantially overlapped.

In the aforementioned antenna module and the manufacturing method thereof, an opening projected contour of the through hole surrounds an opening projected contour of the concave portion.

In the aforementioned antenna module and the manufacturing method thereof, the through hole has a narrow opening close to one side of the plurality of antenna structures, and a wide opening with a width larger than a width of the narrow opening on a side away from the plurality of antenna structures, and an opening projected contour of the narrow opening is substantially overlapped with an opening projected contour of the concave portion, and an opening projected contour of the wide opening surrounds the opening projected contour of the narrow opening.

In the aforementioned antenna module and the manufacturing method thereof, the resonance structure includes a plurality of dielectric layers. For example, a dielectric constant of the outermost dielectric layer of the resonance structure is the largest.

In the aforementioned antenna module and the manufacturing method thereof, the resonance structure is a dielectric body with a dielectric constant greater than 10.

The present disclosure also provides an electronic package, comprising: the aforementioned antenna module; and a package module electrically connected to the antenna module.

The present disclosure further provides a method for manufacturing an electronic package, comprising: providing a package module and the aforementioned antenna module; and electrically connecting the package module to the antenna module.

As can be seen from the above, in the electronic package, the antenna module and the manufacturing method of the present disclosure, the dielectric material and the concave portion are formed between the two adjacent antenna structures, so as to generate different impedance characteristics by different media, so that there is a discontinuous impedance distribution between the two adjacent antenna structures, such that the antenna isolation can be improved. Therefore, compared with the prior art, the electronic package of the present disclosure can still maintain a good antenna signal after being reduced in size, and can increase the antenna gain, thereby significantly improving the antenna operation efficiency.

DETAILED DESCRIPTIONS

The following describes the implementation of the present disclosure with examples. Those skilled in the art can easily understand other advantages and effects of the present disclosure from the contents disclosed in this specification.

It should be understood that, the structures, ratios, sizes, and the like in the accompanying figures are used for illustrative purposes to facilitate the perusal and comprehension of the contents disclosed in the present specification by one skilled in the art, rather than to limit the conditions for practicing the present disclosure. Any modification of the structures, alteration of the ratio relationships, or adjustment of the sizes without affecting the possible effects and achievable proposes should still be deemed as falling within the scope defined by the technical contents disclosed in the present specification. Meanwhile, terms such as "upper," "first," "second," "one" and the like used herein are merely used for clear explanation rather than limiting the practicable scope of the present disclosure, and thus, alterations or adjustments of the relative relationships thereof without essentially altering the technical contents should still be considered in the practicable scope of the present disclosure.

Figure 1A:
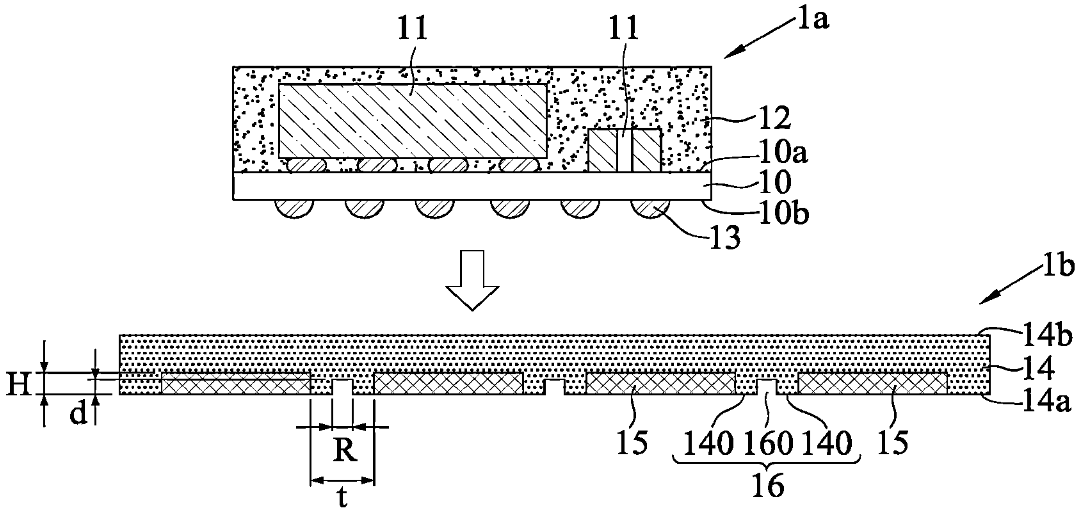
FIGS. 1A to 1B are schematic cross-sectional views illustrating a manufacturing method of an electronic package according to a first embodiment of the present disclosure.
Figure 1B:
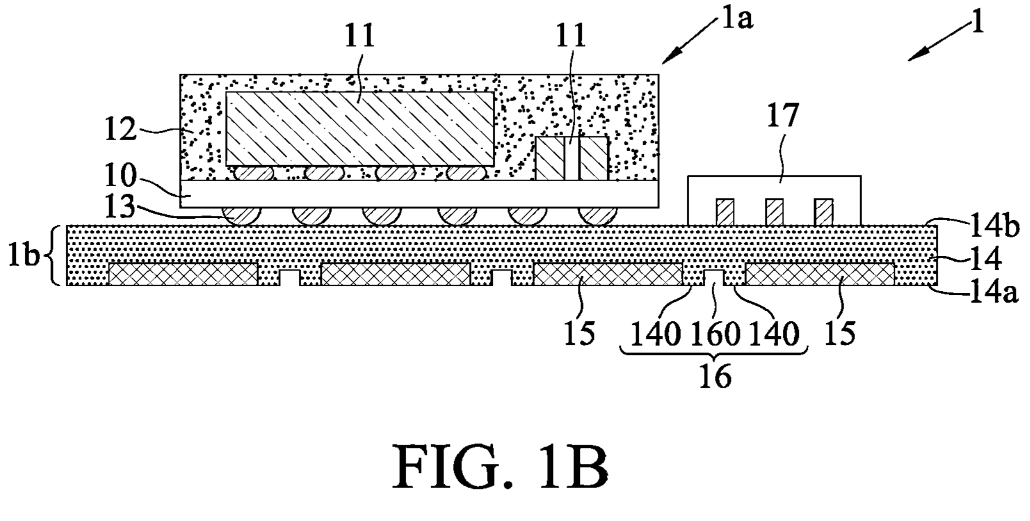

FIGS. 1A to 1B are schematic cross-sectional views illustrating a manufacturing method of an electronic package 1 according to a first embodiment of the present disclosure.

As shown in FIG. 1A, a package module 1*a* and an antenna module 1*b* are provided. The package module 1*a* is a system in package (SiP) structure, which integrates a plurality of chips in a package, and is often provided with passive elements such as at least one capacitor and an inductor, etc. due to the operation requirements of the plurality of chips, so as to quickly store energy and increase/decrease voltages to ensure that electric energy can be effectively and immediately provided to each chip. The antenna module 1*b* is of an antenna substrate specification.

In an embodiment, the package module 1*a* includes a circuit structure 10, a plurality of electronic elements 11 disposed on the circuit structure 10, and a packaging layer 12 disposed on the circuit structure 10 to cover the electronic elements 11.

Furthermore, a manufacturing method of the antenna module 1*b* includes: arranging a plurality of antenna structures 15 arrayed on a plate body 14, and then performing a half-cutting process to cut at least one concave portion 160 on the plate body 14, so that the at least one concave portion 160 is located between two adjacent antenna structures 15, and there is a dielectric material 140 between the at least one concave portion 160 and the antenna structure 15, so that the at least one concave portion 160 and the dielectric material 140 serve as at least one shielding structure 16, such that the plate body 14, the plurality of antenna structures 15 and the shielding structures 16 form a substrate.

The circuit structure 10 is, for example, a package substrate with a core layer or a coreless carrier, which forms a plurality of circuit layers on an insulating material, such as a fan-out type redistribution layer (RDL).

In an embodiment, the material for forming the circuit layer is copper, and the insulating material is a dielectric material such as polybenzoxazole (PBO), polyimide (PI), prepreg (PP) and the like, or a solder-proof material such as solder mask and graphite.

Furthermore, the circuit structure 10 has a first side 10*a* and a second side 10*b* opposite to each other, and a plurality of conductive elements 13 electrically connected to the circuit layer can be formed on the second side 10*b* of the circuit structure 10. For example, the conductive elements 13 are spherical shapes of solder balls, pillar shapes of metal materials such as copper pillars and solder bumps, or stud conductors made by a wire bonding machine, but not limited thereto.

The electronic elements 11 are disposed on the first side 10*a* of the circuit structure 10, and the electronic elements 11 are active elements, passive elements, or combinations of the active elements and the passive elements, etc., wherein the active elements are, for example, semiconductor chips, and the passive elements are, for example, resistors, capacitors and inductors.

In an embodiment, the electronic elements 11 can be electrically connected to the circuit layer of the circuit structure 10 by a flip chip method, a wire bonding method, directly contacting the circuit layer of the circuit structure, or other suitable methods, and there is no special limit.

The packaging layer 12 is disposed on the first side 10*a* of the circuit structure 10 to cover the electronic elements 11.

In an embodiment, the packaging layer 12 is an insulating material, such as polyimide (PI), dry film, an encapsulant such as epoxy resin, or molding compound, but not limited to the above.

The plate body 14 is a base material of an antenna substrate, which has a first surface 14*a* and a second surface 14*b* opposite to each other, so that the plurality of antenna structures 15 and the plurality of the shielding structures 16 are formed on the first surface 14*a* of the plate body 14.

In an embodiment, the plate body 14 has a dielectric material 140 and a pattern layout layer (not shown), so that the plate body 14 can be a package substrate with a core layer and a circuit structure or a coreless circuit structure, but not limited to the above.

The plurality of antenna structures 15 are formed on the first surface 14*a* of the plate body 14, so that the first surface 14*a* of the plate body 14 serves as an antenna signal transmitting and receiving surface of the antenna plate body.

Figure 2A:
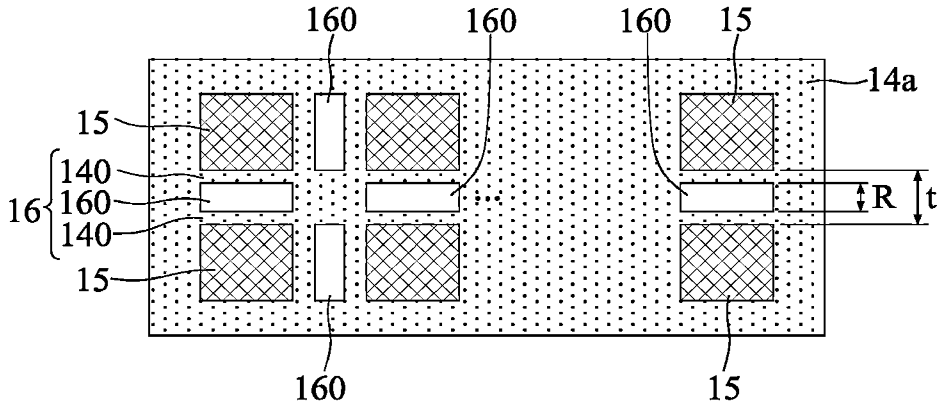
FIGS. 2A to 2D are schematic partial bottom plan views of FIG. 1B.

In an embodiment, the plurality of antenna structures 15 are arrayed on the first surface 14*a*, as shown in FIG. 2A. For example, the antenna structures 15 include multi-layer circuit coupling antenna layers, and can be a single-frequency antenna design or a multi-frequency antenna design with more than two bandwidths.

Each of the shielding structures 16 is formed on the first surface 14*a* of the plate body 14, so that the plurality of shielding structures 16 and the plurality of antenna structures 15 are formed on the same side of the plate body 14 and are staggered (or interspersed), and includes the at least one concave portion 160 and the dielectric material 140 located between the two antenna structures 15, wherein the at least one concave portion 160 is an air gap, and the dielectric material 140 is such as polybenzoxazole (PBO), polyimide (PI), prepreg (PP), etc.

Figure 1C:
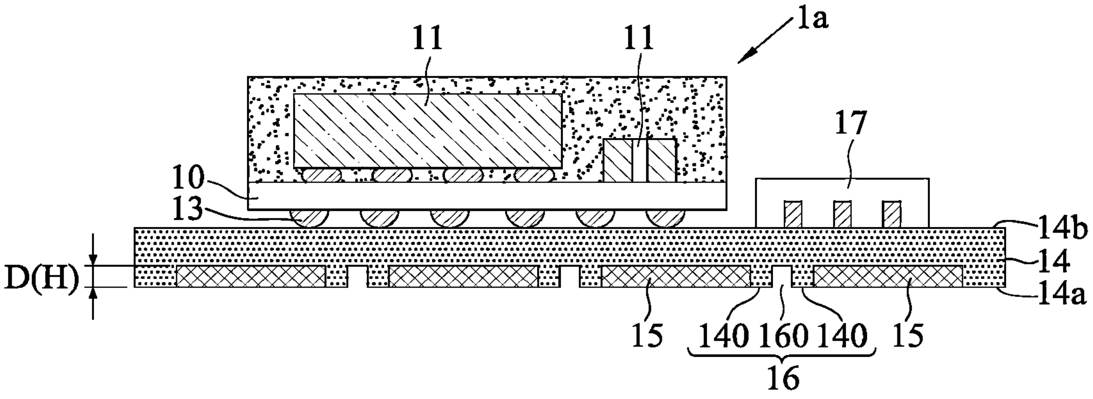
FIGS. 1C and 1D are schematic cross-sectional views of other aspects of FIG. 1B.

In an embodiment, a depth of each of the concave portions 160 can be adjusted according to the height of each of the antenna structures 15. A depth d of each of the concave portions 160 shown in FIG. 1A is less than a height H of each of the antenna structures 15. If the depth d of each of the concave portions 160 is greater than ⅓ of the height H of each of the antenna structures 15, an antenna isolation can be effectively improved. However, the best aspect of each of the concave portions 160 is to completely fit each of the antenna structures 15, that is, the depth D of each of the concave portions 160 corresponds to the layer height of the adjacent antenna structures 15, as shown in FIG. 1C, the depth D is equal to the height H of each of the antenna structures 15.

Furthermore, a width R of each of the concave portions 160 can be a constant value, which is related to the distance t between two adjacent antenna structures 15, as shown in FIG. 1A and FIG. 2A. For example, the width R of each of the concave portions 160 is more than 10% and less than 100% of the distance t (because the dielectric material 140 needs to be retained around each of the concave portions 160).

Figure 1D:
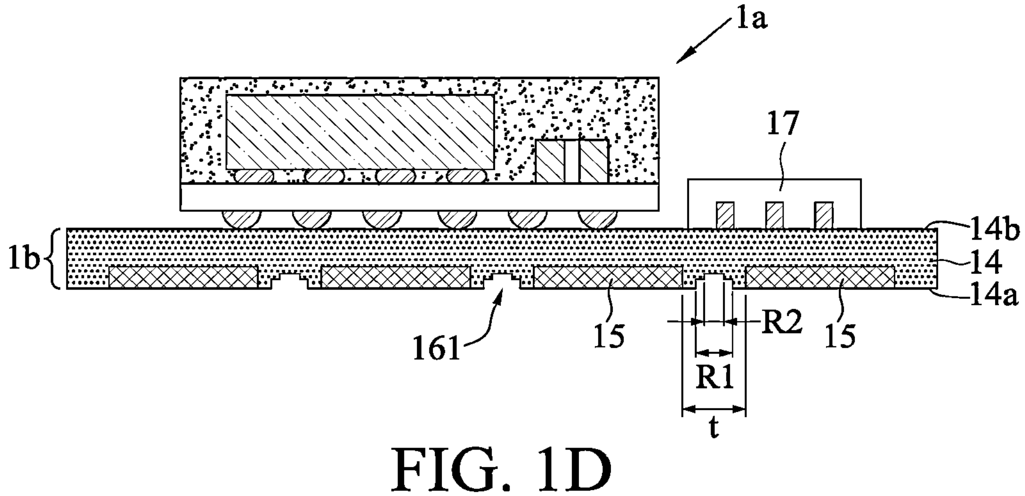

Alternatively, as shown in FIG. 1D, widths R1 and R2 of each of the concave portions 161 are non-constant values, so that the width R2 of each of the concave portions 161 on the side close to the second surface 14*b* of the plate body 14 is narrower, such that each of the concave portions 161 is formed to be wide on the outside and narrow on the inside. For example, the concave portion 161 can be a stepped groove, which is narrow at the top and wide at the bottom as shown in FIG. 1D, so that the plate body 14 will have more pattern layout areas inside. Further, the width R1 of the wide side of each of the concave portions 161 is more than 15% and less than 100% of the distance t (because the dielectric material 140 needs to be retained around each of the concave portions 160), and the width R2 of the narrow side of each of the concave portions 161 is more than 10% and less than 100% of the distance t, wherein the width R2 of the narrow side is less than the width R1 of the wide side.

Figure 2B:
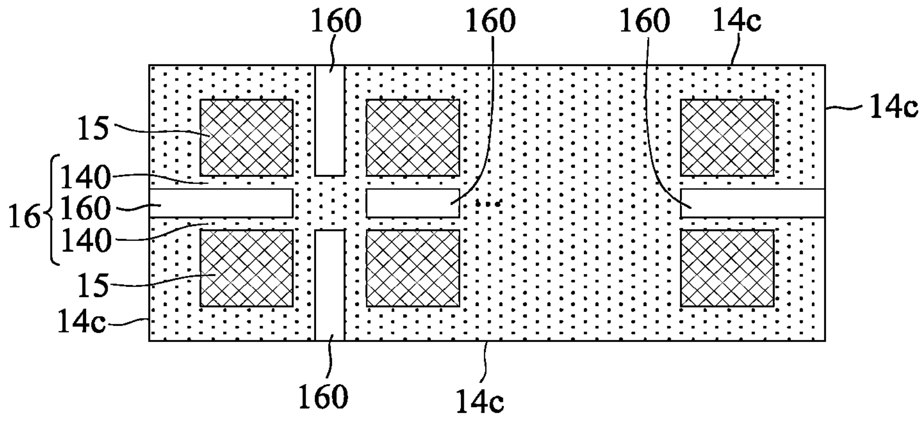
Figure 2C:
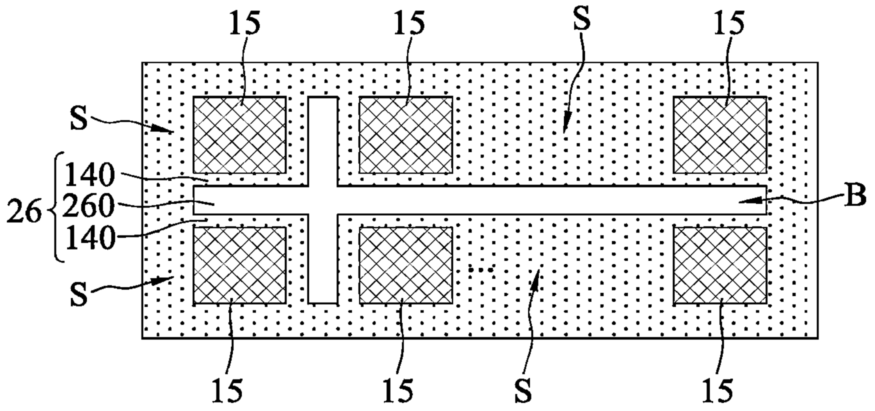

In addition, the plurality of concave portions 160 of the plurality of shielding structures 16 on the plate body 14 are separated from each other and not connected, as shown in FIG. 2A and FIG. 2B. In other embodiments, the concave portions 260 are connected to form a manifold-shaped or tree-shaped groove B, such as a regular staggered shape or a fence shape (or irregular shape) shown in FIG. 2C and FIG. 2D, so that the groove defines a plurality of antenna accommodating areas S, such that at least one of the antenna structures 15 is arranged in a single antenna accommodating area S, so that a shielding structure 26 is integrally spaced with a plurality of the antenna structures 15, so as to improve the shielding effect (i.e., better than the shielding structure 16 shown in FIG. 2A and FIG. 2B).

Figure 2D:
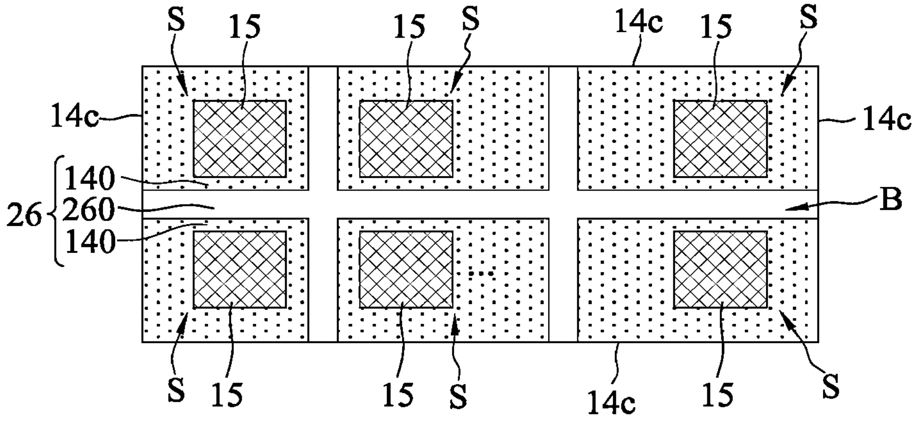

In addition, the concave portion 160, 260 can communicate with side surfaces 14*c* of the plate body 14, as shown in FIG. 2B and FIG. 2D, to enhance the structural flexibility of the antenna module 1*b*, so as to improve the warpage status of the antenna module 1*b*.

It should be understood that the arrangement of the antenna structures 15 related to the antenna module 1*b* is various, and is not limited to the above.

As shown in FIG. 1B, the package module 1*a* is mounted onto the second surface 14*b* of the plate body 14 of the antenna module 1*b* via the conductive elements 13, so that the circuit structure 10 is electrically connected to the plate body 14 via the conductive elements 13, such that the electronic elements 11 are electrically and communicatively connected to the antenna structures 15.

Figure 3A:
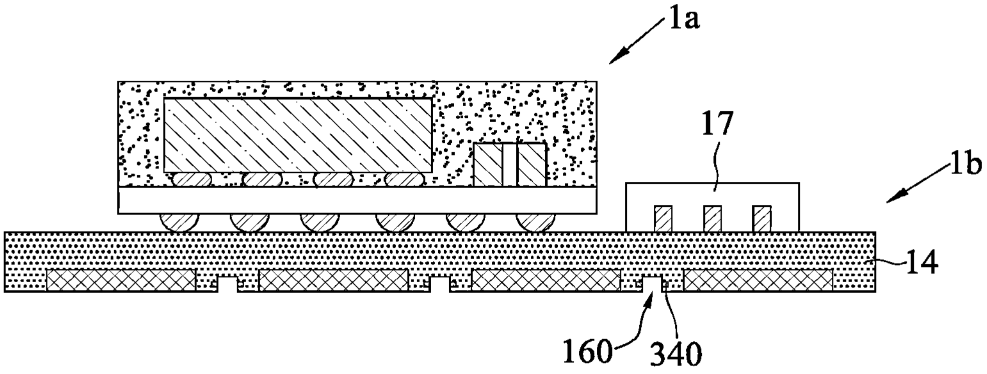
FIGS. 3A and 3B are schematic cross-sectional views of other aspects of FIG. 1B.
Figure 3B:
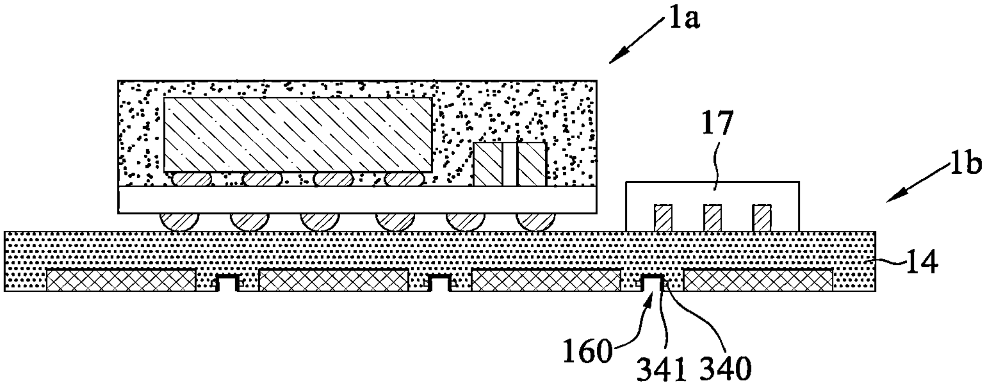

In an embodiment, the plate body 14 may have a ground trace 340 exposed from sidewalls of each of the concave portions 160, as shown in FIG. 3A, to enhance the antenna isolation. Further, as shown in FIG. 3B, a metal layer 341 may be formed by electroplating on the sidewalls of each of the concave portions 160 to electrically connect the ground trace 340. Therefore, by the configuration of the metal layer 341, not only the metal shielding area can be increased, the shielding effect can be better, but also the pattern layout layer in the plate body 14 can be protected, so as to prevent the problem that the surface area of the plate body 14 is increased due to the concave portions 160 of the plate body 14 and then moisture is easily intruded into the pattern layout layer and damages the pattern layout layer, thereby improving the reliability.

Figure 4A:
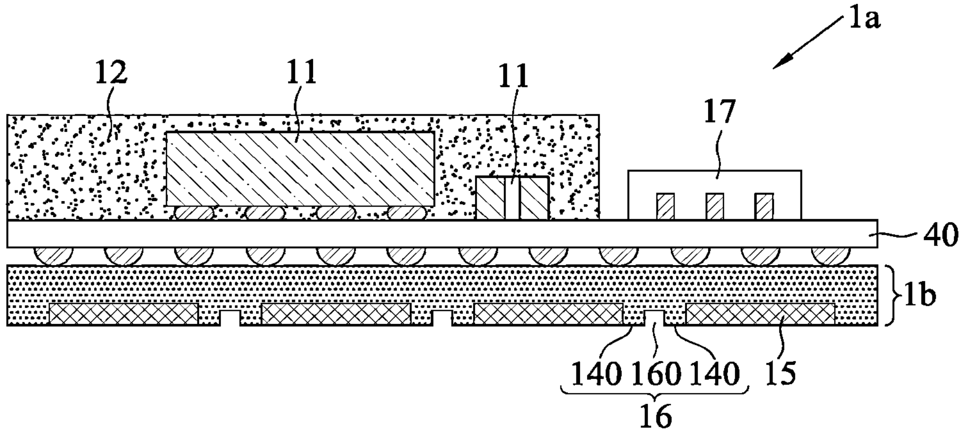
FIGS. 4A and 4B are schematic cross-sectional views of other aspects of FIG. 1B.

Furthermore, the electronic package 1 can be configured with other elements, such as an electronic connector 17, as required. As shown in FIG. 1B, the electronic connector 17 can be mounted on the second surface 14*b* of the plate body 14 of the antenna module 1*b*; or, as shown in FIG. 4A, the electronic connector 17 can be mounted on a circuit structure 40 of the package module 1*a*.

Figure 4B:
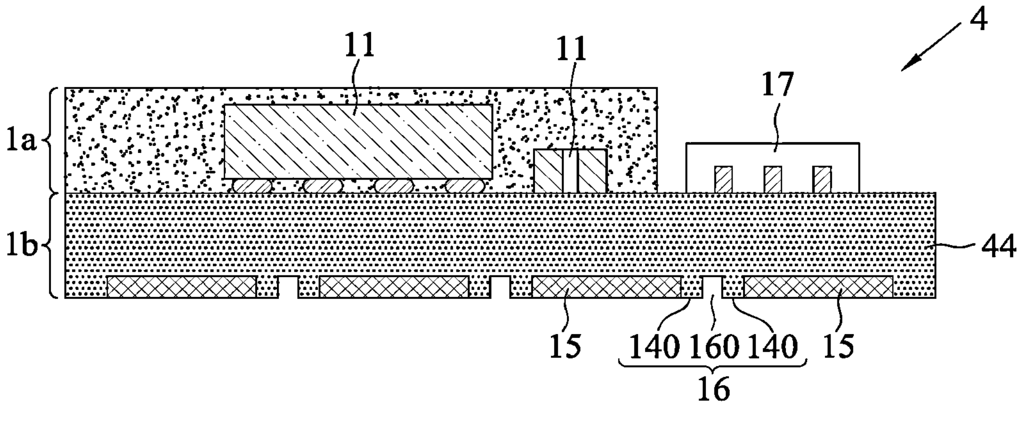

In addition, as shown in FIG. 4B, the package module 1*a* can omit the aforementioned circuit structure, and make the electronic elements 11 disposed on the plate body 44, so that the plate body 44 serves as a common plate for the package module 1*a* and the antenna module 1*b*, that is, the electronic package 4 is of a single substrate specification. It should be understood that since the design of the single plate body 44 will increase the number of layers of pattern layout, the manufacturing cost of the thicker plate body 44 of the electronic package 4 is higher than the manufacturing cost of the double-substrate specification shown in FIG. 1B (a stack of a thinner circuit structure 10 and a thinner plate body 14).

Figure 7:
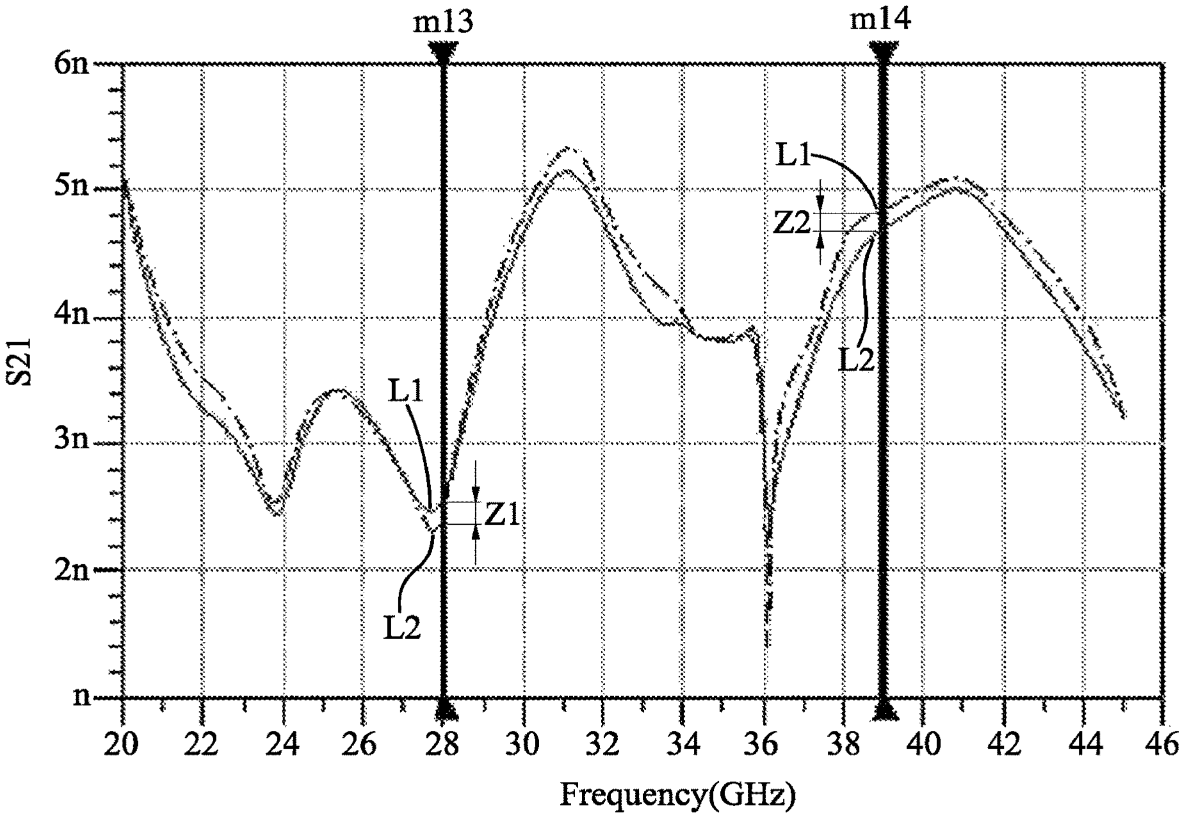
FIG. 7 is a schematic view of a curve of the degree of variation of the antenna isolation during operation of the antenna module of the present disclosure and the conventional antenna module.

Therefore, in the manufacturing method of the present disclosure, the dielectric material 140 and the concave portion 160, 161, 260 are formed between two adjacent antenna structures 15, so that different impedance characteristics are generated by different media (the dielectric material 140 and the air in the concave portion 160, 161, 260), so that there is a discontinuous impedance distribution between the two adjacent antenna structures 15 so as to improve the antenna isolation. Therefore, compared with the prior art, the electronic package 1 of the present disclosure can not only be reduced in size to meet the requirements of miniaturization, but also can prevent mutual signal interference between the antenna structures 15 after reducing the size, increase the antenna gain, so as to significantly improve the antenna operation efficiency. For example, when the frequency of each of the antenna structures 15 is 28 or 39 gigahertz (GHz), as shown in FIG. 7, a curve L1 of an antenna isolation S21 of the present disclosure is better than a curve L2 of an antenna isolation of the conventional single-structure shielding medium (the differences Z1, Z2 of the variation as shown in FIG. 7), wherein n of the vertical axis shown in FIG. 7 is a non-zero integer.

Further, the shielding structure 16, 26 can further release an internal stress of the plate body 14, 44 via the concave portion 160, 161, 260, so that the plate body 14, 44 forms a structure with better flexibility. Thus, the warpage degree of the plate body 14 and 44 can be effectively improved.

In addition, the ground trace 340 is exposed from the sidewalls of each of the concave portions 160 to enhance the antenna isolation. Further, by forming the metal layer 341 on the sidewalls of each of the concave portions 160, not only the metal shielding area can be increased, the shielding effect can be better, but also the problem of damage to the pattern layout layer in the plate body 14 due to intrusion of moisture can be prevented, thereby improving the reliability.

Figure 5A:
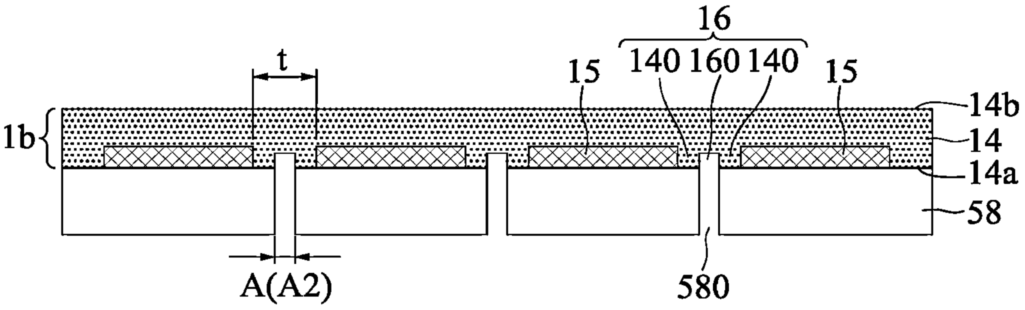
FIGS. 5A to 5B are schematic cross-sectional views illustrating the manufacturing method of the electronic package according to a second embodiment of the present disclosure.
Figure 5B:
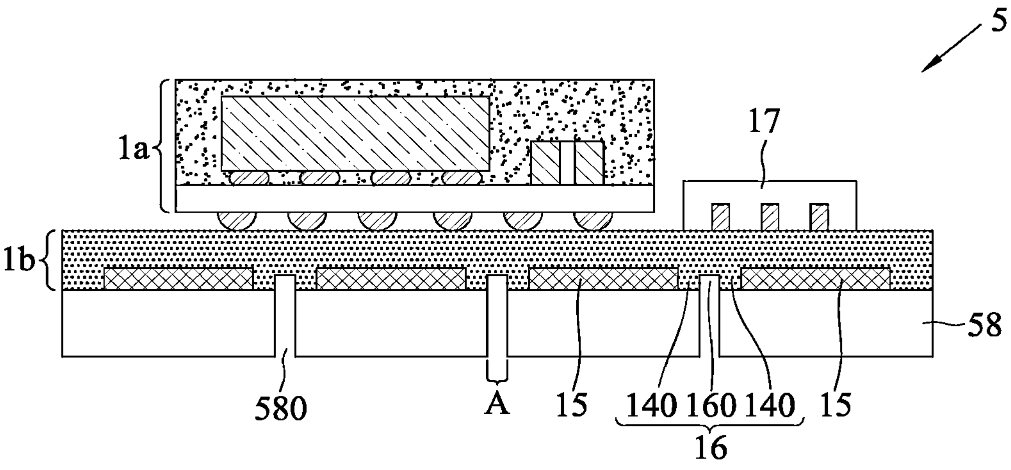

FIGS. 5A to 5B are schematic cross-sectional views illustrating a manufacturing method of an electronic package 5 according to a second embodiment of the present disclosure. The difference between the second embodiment and the first embodiment is that a resonance structure 58 is added on the antenna module 1*b*, and other manufacturing processes and accessories are substantially the same, so the same contents will not be repeated below.

As shown in FIG. 5A, a resonance structure 58 is formed on the first surface 14*a* of the plate body 14, and the resonance structure 58 has a through hole 580 corresponding to the shielding structure 16 (the concave portion 160).

In one way, a manufacturing process of the resonance structure 58 comprises forming a panel package material as the resonance structure 58 on the first surface 14*a* of the plate body 14 before performing the half-cutting process (fabricating the concave portion 160) to cover the plurality of antenna structures 15, and then performing the half-cutting process, so that the half-cutting process also cuts through the panel package material to form the through hole 580, so as to form the resonance structure 58.

In another way, a manufacturing process of the resonance structure 58 comprises first providing the resonance structure 58 having the through hole 580, and the through hole 580 passing through the resonance structure 58, and then pressing the resonance structure 58 onto the plate body 14 having the concave portion 160 to correspondingly cover the antenna structure 15, and the through hole 580 corresponding to the concave portion 160, so that the through hole 580 communicates with the concave portion 160.

In an embodiment, the panel package material is a dielectric material, so that the resonance structure 58 is a dielectric body with a dielectric constant (Dk) greater than 10, and the through hole 580 and the concave portion 160 are overlapped in a vertical direction, and opening projected contours A and A2 of both the through hole 580 and the concave portion 160 are substantially overlapped. A width of the through hole 580 can be a constant value, and is related to the distance t between the adjacent two antenna structures 15. For example, the width of the through hole 580 is more than 10% and less than 100% of the distance t.

Figure 6A:
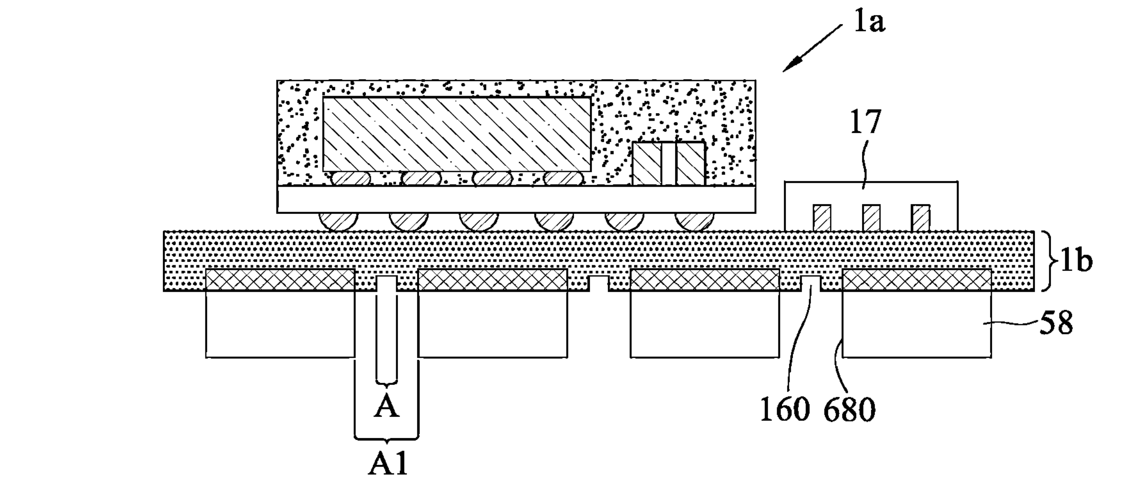
FIGS. 6A, 6B and 6C are schematic cross-sectional views of other aspects of FIG. 5B.

Furthermore, in other embodiments, as shown in FIG. 6A, the through hole 680 and the concave portion 160 are overlapped in a vertical direction, and an opening projected contour A1 of the through hole 680 can surround an opening projected contour A of the concave portion 160. For example, the width of the through hole 680 is more than 15% of the distance t, and the width of the concave portion 160 is more than 10% and less than 100% of the distance t, wherein the width of the through hole 680 is less than the width R1 of the concave portion 160.

Figure 6B:
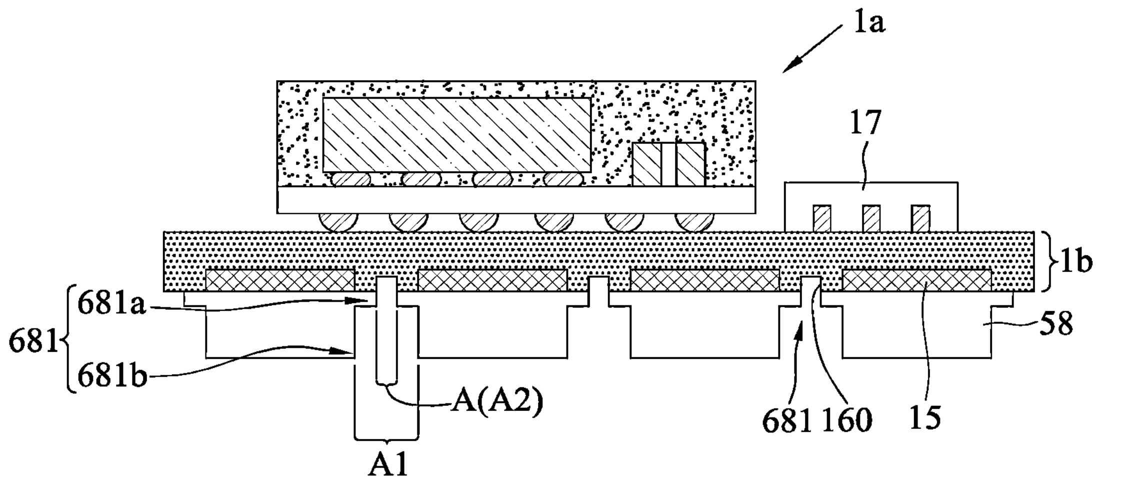

Alternatively, as shown in FIG. 6B, a width of the through hole 681 is a non-constant value, so that the width of the through hole 681 on the side close to the antenna structure 15 is narrower to serve as a narrow opening 681*a*, so that the opening projected contour A2 of the narrow opening 681*a* is equal to the opening projected contour A of the concave portion 160. The opening projected contours A and A2 of the narrow opening 681*a* and the concave portion 160 are substantially overlapped, and the through hole 681 is provided with a wide opening 681*b* on the other side away from the antenna structure 15, the width of which is greater than the width of the narrow opening 681*a* and the opening projected contour A1 of which is greater than the opening projected contour A of the concave portion 160, so that the opening projected contour A1 of the wide opening 681*b* surrounds the opening projected contour A2 of the narrow opening 681*a*, so as to be wide outside and narrow inside. For example, the through hole 681 can be a stepped shape, such as bottom wide and top narrow. Further, the width of the concave portion 160 is more than 10% and less than 100% of the distance t, the width on the wide opening 681*b* side of the through hole 681 is more than 15% of the distance t, and the width on the narrow opening 681*a* side of the through hole 681 is more than 10% of the distance t. It can be understood that when the opening projected contour A2 of the narrow opening 681*a* surrounds the opening projected contour A of the concave portion 160, and the opening projected contour A1 of the wide opening 681*b* surrounds the opening projected contour A2 of the narrow opening 681*a*, the through hole and the concave portion can cooperate to form a three-layer stepped shape (not shown), which can be adjusted according to the electrical/flexibility requirements of the product, which is not limited thereto.

Figure 6C:
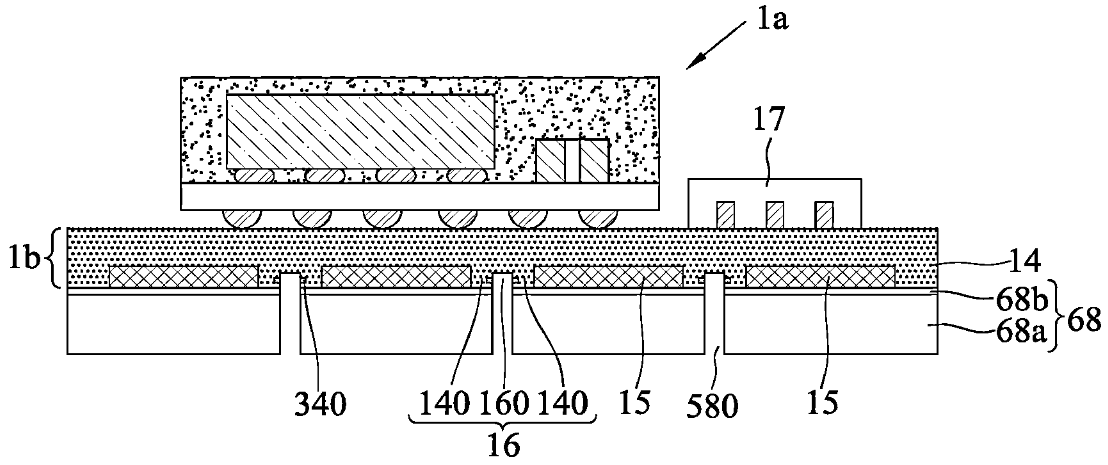

Also, the resonance structure 68 includes a plurality of dielectric layers 68*a*, 68*b*, as shown in FIG. 6C. For example, the dielectric constant (Dk value) of the outermost dielectric layer 68*a* of the resonance structure 68 is the largest (e.g., Dk>10), that is, the dielectric constant of each dielectric layer 68*b* of the inner layer (e.g., Dk>3.5) is smaller than the Dk value of the outermost dielectric layer 68*a*. Therefore, through the design of the multi-layer dielectric layers 68*a*, 68*b*, not only the Dk value can be adjusted according to the antenna gain requirement, but also the adhesion between the resonance structure 68 and the metal material (such as the antenna structure 15) can be strengthened, so as to improve the reliability.

As shown in FIG. 5B, the package module 1*a* is mounted on the antenna module 1*b* via the conductive elements 13.

Therefore, in the present disclosure, a resonance structure 58, 68 is configured on the antenna module 1*b* to form a resonant cavity to improve the antenna gain.

The present disclosure also provides an electronic package 1, 4, 5, comprising: an antenna module 1*b* and a package module 1*a* electrically connected to the antenna module 1*b*, wherein the antenna module 1*b* includes a plate body 14, 44, a plurality of antenna structures 15 arrayed on the plate body 14, 44, and shielding structures 16, 26 arranged on the plate body 14, so that the plate body 14, 44, the plurality of antennas structures 15 and the shielding structures 16, 26 form a substrate.

The shielding structures 16, 26 are located between two adjacent antenna structures 15, wherein each of the shielding structures 16, 26 includes a concave portion 160, 161, 260 formed on the plate body 14 and the dielectric material 140 formed between the concave portion 160, 161, 260 and each of the two adjacent antenna structures 15.

In one embodiment, the depth D of each of the concave portions 160 is equal to the height H of each of the antenna structures 15.

In one embodiment, the depth d of each of the concave portions 160 is less than the height H of each of the antenna structures 15. Further, the depth d of each of the concave portions 160 is greater than ⅓ of the height H of each of the antenna structures 15.

In one embodiment, the plate body 14 has a plurality of the shielding structures 16, so that the plurality of concave portions 160 of the plurality of shielding structures 16 are separated from each other and not connected, and the plurality of shielding structures 16 and the plurality of antenna structures 15 are staggered (or interleaved). Further, the concave portions 160 communicate with the side surfaces 14*c* of the plate body 14.

In one embodiment, the plate body 14 has a plurality of the shielding structures 26, so that the concave portions 260 of the plurality of shielding structures 26 are connected to each other to form a manifold-shaped groove B, so that the groove B defines a plurality of antenna accommodating areas S, such that at least one of the antenna structures 15 is disposed in a single antenna accommodating area S. Further, the concave portion 260 communicates with the side surfaces 14*c* of the plate body 14.

In one embodiment, the widths R1 and R2 of the concave portion 161 are designed to be wide outside and narrow inside.

In one embodiment, the plate body 14 has a ground trace 340 exposed from the sidewalls of each of the concave portions 160. For example, a metal layer 341 is formed on the sidewalls of each of the concave portions 160 to electrically connect the ground trace 340.

In one embodiment, the electronic package 5 further includes resonance structures 58, 68 correspondingly covering the antenna structures 15, and the resonance structures 58, 68 have through holes 580, 680, 681 corresponding to the concave portions 160 and penetrating through the resonance structures 58, 68, so that the through holes 580, 680, 681 communicate with the concave portions 160.

In one embodiment, the opening projected contour A of the through hole 580 and the opening projected contour A of the concave portion 160 are substantially overlapped.

In one embodiment, the opening projected contour A1 of the through hole 680 surrounds the opening projected contour A of the concave portion 160.

In one embodiment, the through hole 681 has a narrow opening 681*a* on the side close to the plurality of antenna structures 15, and a wide opening 681*b* on the side away from the plurality of antenna structures 15 and having a width greater than the width of the narrow opening 681*a*. The opening projected contour A1 of the narrow opening 681*a* and the opening projected contour A, A2 of the concave portion 160 are substantially overlapped, and the opening projected contour A1 of the wide opening 681*b* surrounds the opening projected contour A2 of the narrow opening 681*a*.

In one embodiment, the resonance structure 68 includes a plurality of dielectric layers 68*a*, 68*b*. Further, the dielectric constant of the outermost dielectric layer 68*a* of the resonance structure 68 is the largest.

In one embodiment, the resonance structure 58 is a single dielectric body with a dielectric constant greater than 10.

To sum up, the electronic package, the antenna module and the manufacturing method thereof of the present disclosure use the dielectric material and the concave portion as the shielding structure, so that there is a discontinuous impedance distribution between the two adjacent antenna structures, thereby improving the antenna isolation. Therefore, the electronic package of the present disclosure can meet the requirements of miniaturization and good operation of the antenna at the same time.

Furthermore, through the design of the concave portion, the internal stress of the plate body can be released, so that the plate body can form a structure with better flexibility, thereby effectively improving the degree of warpage of the plate body.

The foregoing embodiments are provided for the purpose of illustrating the principles and effects of the present disclosure, rather than limiting the present disclosure. Anyone skilled in the art can modify and alter the above embodiments without departing from the spirit and scope of the present disclosure. Therefore, the scope of protection with regard to the present disclosure should be as defined in the accompanying claims listed below.

What is claimed is:

1. An antenna module, comprising:

a plate body;

a plurality of antenna structures arrayed on the plate body; and at least one shielding structure disposed on the plate body and located between the two adjacent antenna structures, wherein the plate body, the plurality of antenna structures and the at least one shielding structure form a substrate, wherein the at least one shielding structure includes a concave portion disposed on the plate body and a dielectric material located between the concave portion and the plurality of antenna structures, wherein the plate body has a metal portion exposed from sidewalls of the concave portion.

2. The antenna module of claim 1, wherein the concave portion has a depth equal to a height of each of the plurality of antenna structures.

3. The antenna module of claim 1, wherein the concave portion has a depth less than a height of each of the plurality of antenna structures.

4. The antenna module of claim 3, wherein the depth of the concave portion is greater than ⅓ of the height of each of the plurality of antenna structures.

5. The antenna module of claim 1, wherein the plate body has a plurality of the shielding structures, and a plurality of concave portions of the plurality of shielding structures are spaced apart from each other and not connected, and the plurality of shielding structures and the plurality of antenna structures are staggered.

6. The antenna module of claim 5, wherein the concave portions are communicated to side surfaces of the plate body.

7. The antenna module of claim 1, wherein the plate body has a plurality of the shielding structures, and the concave portions of the plurality of shielding structures are connected to form a manifold-shaped groove, such that the groove defines a plurality of antenna accommodating areas, and at least one of the antenna structures is arranged in the single antenna accommodating area.

8. The antenna module of claim 7, wherein the concave portions are communicated to side surfaces of the plate body.

9. The antenna module of claim 1, wherein the concave portion has a width designed to be wide outside and narrow inside.

10. The antenna module of claim 1, wherein the metal portion is a ground trace.

11. The antenna module of claim 10, further comprising a metal layer formed on the sidewalls of the concave portion and electrically connected to the ground trace.

12. The antenna module of claim 1, further comprising a resonance structure corresponding to cover the plurality of antenna structures, wherein the resonance structure has a through hole corresponding to the concave portion and penetrating through the resonance structure, such that the through hole communicates with the concave portion.

13. The antenna module of claim 12, wherein an opening projected contour of the through hole and an opening projected contour of the concave portion are substantially overlapped.

14. The antenna module of claim 12, wherein an opening projected contour of the through hole surrounds an opening projected contour of the concave portion.

15. The antenna module of claim 12, wherein the through hole has a narrow opening close to one side of the plurality of antenna structures, and a wide opening with a width larger than a width of the narrow opening on a side away from the plurality of antenna structures, and an opening projected contour of the narrow opening is substantially overlapped with an opening projected contour of the concave portion, and an opening projected contour of the wide opening surrounds the opening projected contour of the narrow opening.

16. The antenna module of claim 12, wherein the resonance structure includes a plurality of dielectric layers.

17. The antenna module of claim 16, wherein a dielectric constant of the outermost dielectric layer of the resonance structure is the largest.

18. The antenna module of claim 12, wherein the resonance structure is a dielectric body with a dielectric constant greater than 10.

19. An electronic package, comprising:

the antenna module of claim 1; and a package module electrically connected to the antenna module.

20. A manufacturing method of an antenna module, comprising:

arranging a plurality of antenna structures arrayed on a plate body; and cutting out a concave portion on the plate body, wherein the concave portion is located between the two adjacent antenna structures, and a dielectric material is provided between the concave portion and the plurality of antenna structures, such that the concave portion and the dielectric material serve as a shielding structure, and the plate body, the plurality of antenna structures and the shielding structure form a substrate, wherein the plate body has a metal portion exposed from sidewalls of the concave portion.

21. The manufacturing method of the antenna module of claim 20, wherein the concave portion has a depth equal to a height of each of the plurality of antenna structures.

22. The manufacturing method of the antenna module of claim 20, wherein the concave portion has a depth less than a height of each of the plurality of antenna structures.

23. The manufacturing method of the antenna module of claim 22, wherein the depth of the concave portion is greater than ⅓ of the height of each of the plurality of antenna structures.

24. The manufacturing method of the antenna module of claim 20, wherein the plate body has a plurality of the shielding structures, and a plurality of concave portions of the plurality of shielding structures are spaced apart from each other and not connected, and the plurality of shielding structures and the plurality of antenna structures are staggered.

25. The manufacturing method of the antenna module of claim 24, wherein the concave portions are communicated to side surfaces of the plate body.

26. The manufacturing method of the antenna module of claim 20, wherein the plate body has a plurality of the shielding structures, and the concave portions of the plurality of shielding structures are connected to form a manifold-shaped groove, such that the groove defines a plurality of antenna accommodating areas, and at least one of the antenna structures is arranged in the single antenna accommodating area.

27. The manufacturing method of the antenna module of claim 26, wherein the concave portions are communicated to side surfaces of the plate body.

28. The manufacturing method of the antenna module of claim 20, wherein the concave portion has a width designed to be wide outside and narrow inside.

29. The manufacturing method of the antenna module of claim 20, wherein the metal portion is a ground trace.

30. The manufacturing method of the antenna module of claim 29, further comprising forming a metal layer on the sidewalls of the concave portion, wherein the metal layer is electrically connected to the ground trace.

31. The manufacturing method of the antenna module of claim 20, further comprising, before forming the concave portion, forming a panel package material on the plate body to cover the plurality of antenna structures, and forming a through hole on the panel package material to form a resonance structure.

32. The manufacturing method of the antenna module of claim 20, further comprising providing a resonance structure with a through hole, and the through hole penetrating through the resonance structure, and then pressing the resonance structure onto the plate body to correspondingly cover the plurality of antenna structures, wherein the through hole corresponds to the concave portion, and the through hole communicates with the concave portion.

33. The manufacturing method of the antenna module of claim 32, wherein an opening projected contour of the through hole and an opening projected contour of the concave portion are substantially overlapped.

34. The manufacturing method of the antenna module of claim 32, wherein an opening projected contour of the through hole surrounds an opening projected contour of the concave portion.

35. The manufacturing method of the antenna module of claim 32, wherein the through hole has a narrow opening close to one side of the plurality of antenna structures, and a wide opening with a width larger than a width of the narrow opening on a side away from the plurality of antenna structures, and an opening projected contour of the narrow opening is substantially overlapped with an opening projected contour of the concave portion, and an opening projected contour of the wide opening surrounds the opening projected contour of the narrow opening.

36. The manufacturing method of the antenna module of claim 32, wherein the resonance structure includes a plurality of dielectric layers.

37. The manufacturing method of the antenna module of claim 36, wherein a dielectric constant of the outermost dielectric layer of the resonance structure is the largest.

38. The manufacturing method of the antenna module of claim 32, wherein the resonance structure is a dielectric body with a dielectric constant greater than 10.

39. A manufacturing method of an electronic package, comprising:

providing a package module, and the antenna module of claim 1; and electrically connecting the package module to the antenna module.

* * * * *